(12) United States Patent
Gong et al.

(10) Patent No.: US 11,868,631 B2
(45) Date of Patent: Jan. 9, 2024

(54) SYSTEM STARTUP METHOD AND RELATED DEVICE (71) Applicant: Huawei Technologies Co., Ltd., Shenzhen (CN)

(72) Inventors: Chen Gong, Wuhan (CN); Biao He, Shanghai (CN); Chao Yu, Shenzhen (CN); Wei Fang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 32 days.

(21) Appl. No.: 17/626,331

(22) PCT Filed: Jul. 9, 2020

(86) PCT No.: PCT/CN2020/100972
§ 371 (c)(1),
(2) Date: Jan. 11, 2022

(87) PCT Pub. No.: WO2021/008425
PCT Pub. Date: Jan. 21, 2021

(65) Prior Publication Data
US 2022/0269428 A1 Aug. 25, 2022

(30) Foreign Application Priority Data

Jul. 12, 2019 (CN) .......................... 201910631422.1
Sep. 26, 2019 (CN) .......................... 201910917908.1

(51) Int. Cl.
*G06F 3/06* (2006.01)

(52) U.S. Cl.
CPC .......... *G06F 3/0632* (2013.01); *G06F 3/0619* (2013.01); *G06F 3/0644* (2013.01); *G06F 3/0659* (2013.01); *G06F 3/0673* (2013.01)

(58) Field of Classification Search
CPC .... G06F 3/0632; G06F 3/0619; G06F 3/0644; G06F 3/0659; G06F 3/0673
See application file for complete search history.

(56) References Cited

U.S. PATENT DOCUMENTS 9,336,131 B1 5/2016 Sabjan et al.
2011/0072061 A1 3/2011 Dodge
(Continued)

FOREIGN PATENT DOCUMENTS

CN 1818869 A 8/2006
CN 101136900 A 3/2008
(Continued)

OTHER PUBLICATIONS

Zheng, W., et al., "Research and Implemention of the System Consistencybased on Fast Boot Technique of Android", Master Thesis, Jun. 27, 2014, 86 pages.
(Continued)

Primary Examiner — Edward J Dudek, Jr.
(74) Attorney, Agent, or Firm — Conley Rose, P.C.

(57) ABSTRACT

A system startup method includes creating a first thread when a kernel driver in a kernel mode detects a first disk partition, reading, in the kernel mode, metadata of the first disk partition using the first thread, and writing the metadata of the first disk partition into a first page cache using the first thread. In the kernel mode, metadata of a disk partition is pre-cached into a page cache using the first thread, and in a subsequent process in a user mode, the metadata of the disk partition is directly read from the page cache. A storage area of the page cache is memory and has a higher read/write operation rate compared with a disk.

20 Claims, 4 Drawing Sheets (56) References Cited

U.S. PATENT DOCUMENTS

| | | | |
|---|---|---|---|
| 2012/0204060 A1* | 8/2012 | Swift | G06F 11/1435 714/15 |
| 2015/0242155 A1 | 8/2015 | Memon et al. | |
| 2017/0220777 A1 | 8/2017 | Wang et al. | |
| 2017/0277709 A1 | 9/2017 | Strauss et al. | |
| 2019/0097850 A1 | 3/2019 | Kenney et al. | |
| 2019/0173693 A1 | 6/2019 | Aboul-Magd et al. | |
| 2020/0104067 A1* | 4/2020 | Shaharabany | G06F 9/4416 |
| 2020/0328925 A1 | 10/2020 | Yu et al. | |
| 2021/0135826 A1 | 5/2021 | Yu et al. | |

FOREIGN PATENT DOCUMENTS

| | | | |
|---|---|---|---|
| CN | 101216850 A | | 7/2008 |
| CN | 101706783 A | | 5/2010 |
| CN | 102867141 A | | 1/2013 |
| CN | 102930201 A | | 2/2013 |
| CN | 103150506 A | | 6/2013 |
| CN | 103677900 A | * | 3/2014 |
| CN | 103677900 A | | 3/2014 |
| CN | 103944958 A | | 7/2014 |
| CN | 109521962 A | | 3/2019 |
| CN | 109996343 A | | 7/2019 |
| CN | 110708148 A | | 1/2020 |

OTHER PUBLICATIONS

Anonymous, "Loadable kernel module" Wikipedia, XP055925893, Jan. 3, 2019, pp. 1-6.

Anonymous, "Mount (computing)," Wikipedia, XP055925909, Jun. 18, 2019, pp. 1-3.

Anonymous, "Cache (computing)" Wikipedia, XP055925917, Jul. 7, 2019, pp. 1-9.

* cited by examiner

SYSTEM STARTUP METHOD AND RELATED DEVICE

CROSS-REFERENCE TO RELATED APPLICATIONS

This is a U.S. National Stage of International Patent Application No. PCT/CN2020/100972 filed on Jul. 9, 2020, which claims priority to Chinese Patent Application No. 201910917908.1 filed on Sep. 26, 2019 and Chinese Patent Application No. 201910631422.1 filed on Jul. 12, 2019. All of the aforementioned applications are hereby incorporated by reference in their entireties.

TECHNICAL FIELD

This application relates to the field of electronic technologies, and in particular, to a system startup method and a related device.

BACKGROUND

A terminal device is prone to power-off. If the terminal device is suddenly powered off in a disk file read/write process, a disk file is likely to be damaged. Therefore, to ensure that a disk is available, in a startup process of the terminal device, file system check (file system check, fsck) needs to be performed on a disk partition, to detect whether the disk partition is damaged.

In the conventional technology, after detecting a disk partition, a kernel driver in a kernel mode (kernel mode) reports a disk partition event to a user mode (user mode), and after obtaining the disk partition event through listening, a user space process (ueventd) in the user mode generates corresponding disk partition nodes. Subsequently, another program in the user mode can read/write the disk partition by reading/writing the corresponding node. After an initialization (init) process in the user mode learns, through listening, that the disk partition nodes are generated, the init process starts subprocess file system check (file system check, fsck). In a fsck process, it is checked whether these disk partition nodes are abnormal. If a check result is normal, the init process mounts the disk partition.

A read/write (input/output, I/O) operation needs to be performed on the disk in the fsck process, and the another program in the user mode can run only after check is completed in the fsck process. Therefore, congestion may occur when a system of the terminal device starts, which increases time required for system startup.

SUMMARY

Embodiments of this application provide a system startup method and a related device, including: creating a first thread when a kernel driver in a kernel mode detects a first disk partition; reading, in the kernel mode, metadata of the first disk partition by using the first thread; and writing the metadata of the first disk partition into a first page cache by using the first thread.

In the kernel mode, metadata of a disk partition is pre-cached into a page cache by using the first thread, and in a subsequent fsck process in a user mode, the metadata of the disk partition may be directly read from the page cache. A storage area of the page cache is memory and has a higher read/write operation rate compared with a disk. Therefore, congestion occurring when a system of a terminal device starts can be effectively avoided, and time required for system startup can be reduced.

According to a first aspect, this application provides a system startup method, including:

after a terminal device is powered on and started, first detecting, by a kernel driver in a kernel mode, a disk partition, and creating a first thread when the kernel driver in the kernel mode detects a first disk partition;

reading, in the kernel mode, metadata of the first disk partition by using the first thread; and writing the metadata of the first disk partition into a first page cache by using the first thread. The first page cache is managed by first address space (i_mapping), the first address space is managed by a first inode (bd_inode), and the first inode is managed by a block device pointer (bdev).

In the embodiments of this application, in the kernel mode, the first thread pre-caches the metadata of the disk partition to the page cache. In a subsequent file system check fsck process and a mount (mount) process in a user mode, the metadata of the disk partition may be directly read from the page cache. Because of the fsck process and the mount process in the user mode, the cached data in the first page cache may be read instead of reading the first disk partition, and fsck and mounting are performed on the metadata of the first disk partition. Data in the first page cache is cached in a memory. Therefore, a speed of reading the first page cache is far greater than a speed of reading the first disk partition. In addition, the first thread may pre-cache the metadata of the disk partition into the page cache in parallel with another system startup process, which reduces time required for system startup. Therefore, congestion occurring when a system of the terminal device starts can be effectively avoided, and time required for system startup can be reduced.

With reference to the first aspect, in an embodiment of the first aspect, the creating a first thread when the kernel driver in the kernel mode detects a first disk partition includes:

detecting, by using the kernel driver in the kernel mode, whether a current disk partition is the first disk partition, where the kernel driver detects, by calling an initialization function, whether a partition number of the disk partition is a first partition number, to determine whether the disk partition is the first disk partition, and the initialization function may be "add_partition( )";

when determining, by using the kernel driver, that the current disk partition is the first disk partition, calling a first function to create the first thread, where the first function may be "kthread_run(read_pagecaches, NULL, "fsck_boost""; and transferring a first structure pointer and the first partition number of the first disk partition to the first thread, where the first structure pointer is a generic disk structure pointer of the first disk partition, the first structure pointer may be "struct gendisk *disk", and the first partition number is a partition number of the first disk partition.

In the embodiments of this application, the first thread is created by calling the first function, and the first structure pointer and the first partition number of the first disk partition are transferred to the first thread, so that the first thread can perform an operation on the first disk partition. This improves implementation flexibility of this solution.

With reference to the first aspect, in an embodiment of the first aspect, the reading metadata of the first disk partition by using the first thread includes:

calling a third function by using the first thread to enable the first disk partition; and after the first disk partition is enabled by using the first thread, the metadata (metadata) of the first disk partition needs to be read, and in this case, calling a page operation function by using the first thread, and reading the metadata of the first disk partition by using the page operation function. The page operation function may be a "pagechache" operation function. The metadata is used to store status information of a file system corresponding to the disk partition.

In the embodiments of this application, the first disk partition is enabled by calling the third function, and the first thread may read the metadata of the first disk partition by calling the page operation function. This improves implementation flexibility of this solution.

With reference to the first aspect, in an embodiment of the first aspect, before the calling a third function by using the first thread to enable the first disk partition, the method further includes:

calling a second function by using the first thread based on the first structure pointer and the first partition number of the first disk partition, to obtain a first block pointer, where the first block pointer is a block device structure pointer corresponding to the first disk device, and for example, the second function is "bdget_disk(disk, partno)", where "disk" is the first structure pointer, and "partno" is the first partition number, where the first thread may obtain, by using the second function, the block device (block device) structure pointer corresponding to the first disk partition; the pointer is referred to as the first block pointer, and specifically, the first block pointer is "bdev"; and calling the third function by using the first thread, and transferring the first block pointer to the third function; and enabling the first disk partition based on the first block pointer by using the third function.

In the embodiments of this application, the first thread of the terminal device calls the second function based on the first structure pointer and the first partition number of the first disk partition, to obtain the first block pointer. The first thread calls the third function, and transfers the first block pointer to the third function, to enable the first disk partition. This improves feasibility of this solution.

With reference to the first aspect, in an embodiment of the first aspect, the reading the metadata of the first disk partition by using the page operation function includes:

transferring, to the page operation function by using the first thread, an amount of data that needs to be read and an offset status of the amount of data that needs to be read; and reading, by using the page operation function, the metadata of the first disk partition based on the amount of data that needs to be read and the offset status of the amount of data that needs to be read. In this way, the amount of data read by the page operation function is close to an actual requirement, to avoid an extreme case in which an excessively large or excessively small amount of data is read, and improve feasibility of this solution.

With reference to the first aspect, in an embodiment of the first aspect, the reading the metadata of the first disk partition by using the page operation function includes:

writing the read metadata of the first disk partition into the first page cache by using the page operation function. The page operation function may write the metadata of the first disk partition into the first page cache by using a "_do_page_cache_readahead(mapping, NULL, offset, nr_to_read, 0)" function.

With reference to the first aspect, in an embodiment of the first aspect, the method further includes:

The terminal device performs a power-on action according to an original process. After a system is started and enters the user mode, the terminal device needs to perform a file system check (file system check, fsck) on the first disk partition. Performing the file system check on the first disk partition in a user mode, and if a file system check fsck result of the first disk partition is normal, querying, based on a first index relationship and by calling a fourth function, whether cached data exists in the first page cache, where the first index relationship includes first address space that manages the first page cache and a first index node that manages the first address space, and the first index relationship is "bdev-bd_inode-i_mapping"; and if the cached data exists in the first page cache, performing mounting by using the cached data.

In the embodiments of this application, after entering the user mode, if the file system check result is normal, the metadata of the first disk partition is normal data, and the terminal device does not need to repair this part of data. The cached data cached in the first page cache may be used to perform a subsequent mount process. A mount process speed is greatly increased and time required for system startup is reduced.

With reference to the first aspect, in an embodiment of the first aspect, after the querying whether cached data exists in the first page cache, the method further includes:

if the cached data does not exist in the first page cache, reading the metadata of the first disk partition by calling a fifth function; and performing mounting by using the metadata of the first disk partition, to ensure normal startup of the system.

With reference to the first aspect, in an embodiment of the first aspect, the method further includes:

applying for first memory space by using the first thread in the kernel mode; reading the metadata of the first disk partition by using the first thread; and writing the metadata of the first disk partition into the first memory space by using the first thread; and establishing a first file node by using the first thread, where the first file node is mapped to the first memory space; in a user mode, reading, by accessing the first file node, the metadata that is of the first disk partition and that is cached in the first memory space; and performing file system check on the cached metadata of the first disk partition, and writing a result into the first disk partition while writing the result into the first memory space by accessing the first file node.

In the embodiments of this application, when the terminal device system is started, in the kernel mode, the metadata of the first disk partition is cached in the first memory space by calling the first thread. In a subsequent user mode, when the file system check is performed, the metadata that is of the first disk partition and that is cached in the first memory space is directly read. Because the first thread caches the metadata of the first disk partition in the first memory space, this action may be performed in parallel with another startup process, to effectively reduce time required for system startup.

According to a second aspect, a terminal device is provided. The terminal device has a function of implementing the system startup method in the first aspect. The function may be implemented by hardware, or may be implemented by hardware by executing corresponding software. The hardware or the software includes one or more modules corresponding to the function.

According to a third aspect, a terminal device is provided, and the apparatus includes a transceiver, a memory, and a processor. The transceiver, the memory, and the processor communicate with each other through an internal connection path. The memory is configured to store instructions. The processor is configured to execute the instructions stored in the memory, to control a receiver to receive a signal and control a transmitter to send a signal. In addition, when the processor executes the instructions stored in the memory, the processor is enabled to perform the method according to the first aspect or any possible implementation of the first aspect.

According to a fourth aspect, a computer program product is provided. The computer program product includes computer program code; and when the computer program code is run on a computer, the computer is enabled to perform the method according to the foregoing aspects.

According to a fifth aspect, a computer-readable medium is provided. The computer-readable medium is configured to store a computer program, and the computer program includes instructions used to perform the method according to the foregoing aspects.

According to a sixth aspect, a chip system is provided, and includes a processor. The processor is configured to invoke a computer program from a memory and run the computer program.

It can be learned from the foregoing technical solutions that the embodiments of this application have the following advantages:

A first thread is created when a kernel driver in a kernel mode detects a first disk partition; in the kernel mode, metadata of the first disk partition is read by using the first thread; and the metadata of the first disk partition is written into a first page cache by using the first thread.

In the kernel mode, metadata of a disk partition is pre-cached into a page cache by using the first thread, and in a subsequent fsck process in a user mode, the metadata of the disk partition may be directly read from the page cache. A storage area of the page cache is memory and has a higher read/write operation rate compared with a disk. Therefore, congestion occurring when a system of a terminal device starts can be effectively avoided, and time required for system startup can be reduced.

DESCRIPTION OF EMBODIMENTS

Before embodiments are described, several concepts that may be used in the embodiments are first described. It should be understood that the following explanations of the concepts may be limited due to a specific case in the embodiments, but this does not indicate that this application is limited to the specific case. The following explanations of the concepts may also vary with a specific case in different embodiments.

File system check: A file system on a computer is usually in one of two states: clean (clean) or dirty (dirty). To mount a file system to a disk partition, the file system needs to be clean. In other words, the file system needs to be structurally complete and consistent between metadata and data. However, sometimes consistency of the file system may be damaged. For example, when the system is powered off, the data in the memory may be lost, or data consistency of the file system may be damaged due to a disk fault, such as a bad sector. To check and maintain inconsistency of the file system, the file system provides a file system check (fsck) for a user to check and repair the file system.

The startup file system check method proposed in this application may be applied to a terminal device. The terminal device may be a wireless terminal that provides a user with voice and/or data connectivity, a handheld device with a wireless connection function, or another processing device connected to a wireless modem. The wireless terminal may communicate with one or more core networks through a radio access network (radio access network, RAN). The wireless terminal may be a mobile terminal, for example, a mobile phone (or referred to as a "cellular" phone) or a computer of the mobile terminal, or may be a personal computer (personal computer), for example, may be a portable, pocket-sized, handheld, computer built-in, or in-vehicle mobile apparatus, which exchanges voice and/or data with the radio access network. For example, the terminal is a device such as a personal communications service (personal communications service, PCS) phone, a cordless phone, a session initiation protocol (session initiation protocol, SIP) phone, a wireless local loop (wireless local loop, WLL) station, or a personal digital assistant (personal digital assistant, PDA). The wireless terminal may also be referred to as a system, a subscriber unit (subscriber unit), a subscriber station (subscriber station), a mobile station (mobile station), a remote station (remote station), an access point (access point), a remote terminal (remote terminal), an access terminal (access terminal), a user terminal (user terminal), a user agent (user agent), a user device (user device), or user equipment (user equipment, UE). This is not specifically limited herein.

Figure 1:
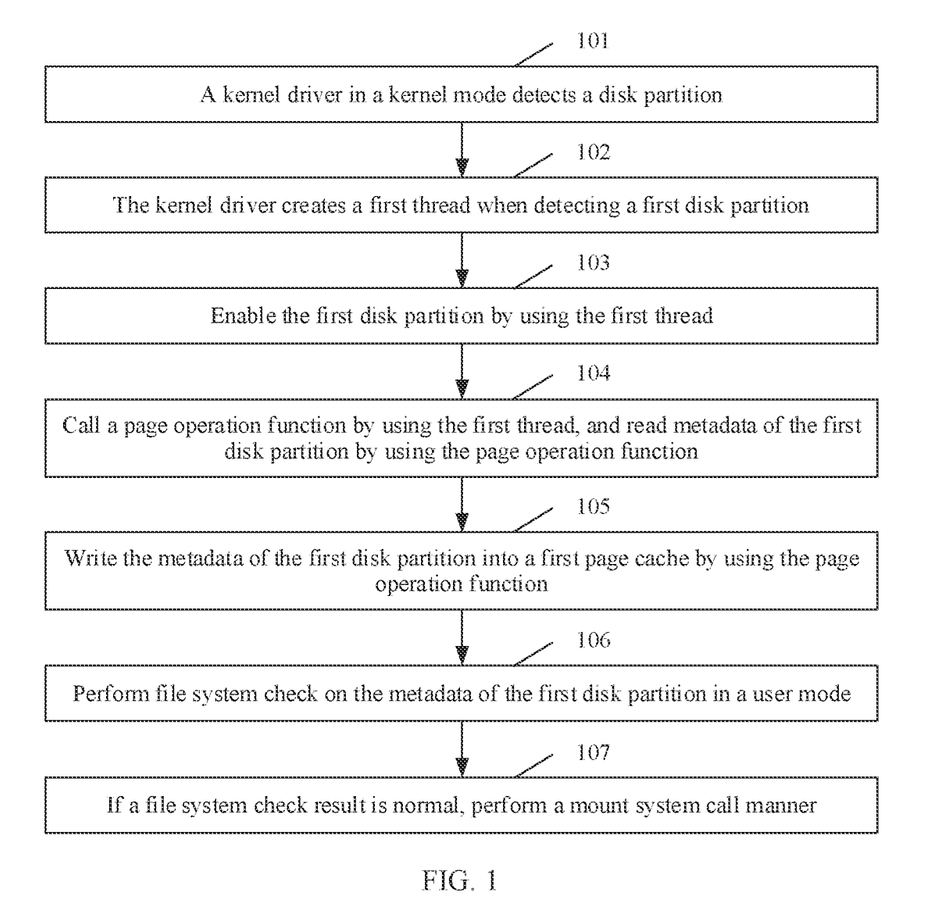
FIG. 1 is a schematic diagram of an embodiment of a system startup method according to an embodiment of this application.

To make a person skilled in the art understand the technical solutions in this application better, the following describes the embodiments of this application with reference to the accompanying drawings in the embodiments of this application. FIG. 1 is a schematic diagram of an embodiment of a system startup method according to an embodiment of this application. In this embodiment of this application, an example in which a system of a terminal device is a Linux system is used for description.

101: A kernel driver in a kernel mode detects a disk partition.

In this embodiment, after the terminal device is powered on and started, the kernel driver in the kernel mode first detects the disk partition. Specifically, the kernel driver determines whether the disk partition is a preset disk partition by detecting whether a partition number of the disk partition is a preset partition number.

In this embodiment, the preset disk partition is referred to as a first disk partition in this embodiment of this application. In an optional implementation, the first disk partition is a "userdata" partition. In this case, a partition name of the first disk partition is preset as "userdata". It should be noted that, in addition to the preset "userdata" partition, the first disk partition may be another disk partition, for example, an "A" partition. Alternatively, the first disk partition may be a plurality of disk partitions. For example, the first disk partition is a "data" partition and an "A" partition. This is not limited herein.

In an optional implementation, the kernel driver first calls an initialization function, and the initialization function may be an "add_partition( )" function. The initialization function then detects a partition name of each disk partition. When detecting that a partition name is "userdata", the initialization function determines that a disk partition corresponding to the partition name is the first disk partition.

Because the kernel driver detects, in a traversal manner, whether each disk partition is the first disk partition, each time the kernel driver detects a disk partition, the kernel driver assigns a partition number corresponding to the disk partition. For example, when the kernel driver detects the first disk partition "A", the kernel driver marks a partition number of the disk partition as 1. When the kernel driver detects a second disk partition "userdata", the kernel driver marks a partition number of the disk partition is "2". Because a partition name of the disk partition is "userdata", and the partition name of the disk partition is consistent with a partition name of a predefined first disk partition. Therefore, the kernel driver determines that the partition is the first disk partition, and determines that the partition number "2" of the disk partition is a first partition number.

102: The kernel driver creates a first thread when detecting the first disk partition.

In this embodiment, when the kernel driver detects that a partition name of a disk partition is a preset partition name, the kernel driver determines that the currently detected disk partition is the first disk partition. When the kernel driver detects the first disk partition, the kernel driver may create the first thread by calling a first function or another function predefined by a user. This is not limited herein. The first thread is created, where the first thread is a thread that runs independently and runs in parallel with another thread in the kernel mode. The first thread may be a "fsck_boost" thread, or may be another thread predefined by the user. This is not limited herein.

In an optional implementation, an example in which the first function is a "kthread_run(read_pagecaches, NULL, "fsck_boost"")" function is used for description. The kernel driver detects, by using the first function, that a current disk partition name is "userdata", and a return value of "fsck_boost" in the first function is "1", that is, fsck_boost=1. In this case, the kernel driver determines, based on the returned value, that a current disk partition is the first disk partition. In this case, the kernel driver creates the first thread by calling the first function.

When creating the first thread, the kernel driver transfers, to the first thread, a general structure pointer corresponding to the first disk partition, and the kernel driver further transfers, to the first thread, a partition number corresponding to the first disk partition. The general structure pointer is referred to as a first structure pointer in this embodiment of this application. The partition number is the first partition number. This structure is used to indicate a physical page that has been cached in a file. When reading a file, the system queries whether required data has been cached based on an index relationship of the file. If the data has not been cached, the system initiates a read/write request to a disk.

In an optional implementation, the first structure pointer is "struct gendisk *disk".

103: Enable the first disk partition by using the first thread.

In this embodiment, first, the first thread obtains a first block pointer by calling a second function based on the first structure pointer and the first partition number. In an optional implementation, the second function may be "bdget_disk(disk, partno)". For example, the second function is "bdget_disk(disk, partno)", where "disk" is the first structure pointer, and "partno" is the first partition number. The first thread may obtain, by using the second function, a block device (block device) structure pointer corresponding to the first disk partition. The pointer is referred to as the first block pointer, and specifically, the first block pointer is "bdev".

Then, a third function is called based on the first block pointer by using the first thread, and the first block pointer is transferred to the third function. The third function is configured to enable the first disk partition. In an optional implementation, the third function may be "blkdev_get (bdev, FMODE_READ, NULL)". For example, the third function is "blkdev_get(bdev, FMODE_READ, NULL)", where "bdev" is the first block pointer, the first disk partition is found by using the first block pointer, "FMODE_READ" indicates a read-only mode, and "NULL" is an irrelevant variable and can be empty.

Finally, the third function enables the first disk partition by using the third function and the first block pointer transferred to the third function.

104: Call a page operation function by using the first thread, and read metadata of the first disk partition by using the page operation function.

In this embodiment, after the first disk partition is enabled by using the first thread, the metadata (metadata) of the first disk partition needs to be read. In this case, the first thread may call the page operation function, and read the metadata of the first disk partition by using the page operation function. The page operation function may be a "pagechache" operation function. The metadata is used to store status information of a file system corresponding to the disk partition.

Specifically, an amount of data that needs to be read is transmitted to the page operation function by using the first thread, where the amount of data that needs to be read is determined by metadata amount of the first disk partition. Usually, when a total capacity of the first disk partition is 64 gigabytes (gigabyte, GB), the metadata amount of the first disk partition is 200 megabytes (mbit, MB). Therefore, the amount of data that needs to be read is 200 MB. If the total capacity of the first disk partition is 512 GB, the amount of data that needs to be read is 500 MB. It should be noted that when the metadata amount of the first disk partition is 300 MB, the amount of data that needs to be read may be less than 30) MB, for example, 100 MB, or may be greater than 300 MB, for example, 400 MB, which is not limited herein.

In addition, an offset status of the amount of data that needs to be read further needs to be transmitted to the page operation function by using the first thread. The page reads the metadata of the first disk partition, and the metadata (for example, 200 MB) is usually stored in 0-0 to 0xC800000 of an address of the disk partition. Therefore, the offset status of the amount of data that needs to be read is usually 0.

In an optional implementation, the page operation function may read the metadata of the first disk partition by using a "_do_page_cache_readahead(mapping, NULL, offset, nr_to_read, 0)" function.

It should be noted that, because the first thread is a thread in the kernel mode, and the first thread reads the metadata of the first disk partition in the kernel mode, the page operation function called by the first thread runs in the kernel mode. The page operation function does not need to include an operation on a "struct file" file structure pointer.

105: Write the metadata of the first disk partition into a first page cache by using the page operation function.

In this embodiment, after the metadata of the first disk partition is read, the metadata of the first disk partition is written into the first page cache (pagecache) by using the page operation function.

Specifically, the first page cache is managed by first address space (i_mapping), the first address space is managed by a first inode (bd_inode), and the first inode is managed by a block device pointer (bdev). In this embodiment of this application, the management relationship is referred to as a first index relationship, the first index relationship is "bdev-bd_inode-i_mapping", and the first index node corresponds to the first disk partition.

In an optional implementation, the page operation function may write the metadata of the first disk partition into the first page cache by using the "_do_page_cache_readahead (mapping, NULL, offset, nr_to_read, 0)" function.

After writing the metadata of the first disk partition into the first page cache, the page operation function may read, by using the first index relationship, the metadata of the first disk partition cached in the first page cache. The metadata of the first disk partition cached in the first page cache is referred to as cached data.

106: Perform file system check on the metadata of the first disk partition in a user mode.

In this embodiment, after step 105, the terminal device performs a power-on action according to an original process. After a system is started and enters the user mode, the terminal device needs to perform the file system check (file system check, fsck) on the first disk partition. In the foregoing step, the terminal device has cached the metadata of the first disk partition to the first page cache. Therefore, in the user mode, the terminal device may perform the file system check on cached data in the first page cache, instead of reading the first disk partition and performing the file system check on the metadata of the first disk partition.

Specifically, in the user mode, a file system check process may be started by using an initialization (init) process. In this case, the file system check obtains the cached data by accessing an address "dev/block/userdata" of the first disk partition. The cached data is the metadata of the first disk partition cached in the first page cache.

"dev/block/userdata" in the user mode has an association relationship with the first index relationship "bdev-bd_inode-i_mapping" in the kernel mode. Therefore, the cached data in the first page cache corresponding to the first address space may be read by accessing "dev/block/userdata". If read and write operations are required in the file system check process, the read and write operations are performed on an object "dev/block/userdata". It should be noted that "userdata" in "dev/block/userdata" is only an example for description, and may be another address name based on actual disk partitions.

When a file system check result is normal, step 107 is performed. When a file system check result is abnormal, an original file system check process of the system is entered, and the first disk partition is repaired.

107: If the file system check result is normal, perform a mount system call manner.

In this embodiment, after the file system check ends, and the file system check result of the disk partition is normal, the terminal device needs to mount (mount) the disk partition. The mounting is a mount name of a disk partition, and the disk partition needs to be mounted with a file system, for example, a flash friendly file system (flash friendly file system, F2FS) or a fourth extended file system (fourth extended file system, EXT4). Only the user can access files on the partition.

Therefore, when the file system check result on the cached data (that is, the metadata of the first disk partition) in step 106 is normal, step 107 is performed.

First, the terminal device calls a fifth function to start a mount process, and calls a fourth function by using the fifth function to query whether the cached data exists in the first page cache. The fourth function may be an independent function, or may be a subfunction of the fifth function. This is not limited herein.

Specifically, in the user mode, the terminal device obtains the first index relationship by using the fifth function. Then, the fourth function learns the first page cache based on the first index relationship.

In an optional implementation, when the first disk partition is mounted as the F2FS file system, the fifth function carries "sbi", where "sbi" is a variable in the fifth function. "sbi" points to "sb", where "sb" is a structure pointer of a standard superblock (superblock) in the Linux system, "sb" further points to "s_bdev", and "s_bdev" points to a block device on which the file system is installed. In this embodiment, "s_bdev" points to a block device corresponding to the first disk partition, that is, "bdev", where "bdev" stores the first inode "bd_inode" corresponding to the first disk partition, and the first inode manages the first address space "i_mapping".

Therefore, the fifth function may obtain the first index relationship "bdev-bd_inode-i_mapping" by using "sbi-sb-s_bdev", and finally obtain an index relationship "sbi-sb-s_bdev-bd_inode-i_mapping". The fifth function transfers the first index relationship to the fourth function, and the fourth function may obtain the first address space by using the first index relationship. The first address space manages the first page cache. In this embodiment, the fifth function may be "get_meta_page_ex( )", and the fourth function may be "page=find_lock_page (mapping, index)", where "mapping" is a position read by the fourth function, and in this embodiment, the "mapping" is "i_mapping".

When the fourth function detects that cached data exists in a storage area (the first page cache) corresponding to the first address space, the terminal device performs mounting by using the cached data. After the mounting is successful, the terminal device calls "blkdev_put" to release the data in the first page cache. When the fourth function detects that no cached data exists in the storage area corresponding to the first address space, the fourth function sends a detection result range to the fifth function. The fifth function reads the metadata of the first disk partition from the first disk partition based on the detection result. In an optional implementation solution, if the fourth function is a subfunction of the fifth function, the fifth function calls, based on the detection result, a function other than the fourth function in the fifth function, to read the metadata of the first disk partition from the first disk partition.

The fifth function uses the metadata of the first disk partition to perform the mount process.

In this embodiment of this application, in the kernel mode, the first thread pre-caches the metadata of the disk partition to the page cache, and in the subsequent fsck process and the mount process in the user mode, the metadata of the disk partition may be directly read from the page cache. Because of the fsck process and the mount process in the user mode, the cached data in the first page cache may be read instead of reading the first disk partition, and fsck and mounting are performed on the metadata of the first disk partition. Data in the first page cache is cached in a memory. Therefore, a speed of reading the first page cache is far greater than a speed of reading the first disk partition. In addition, an action in which the first thread pre-caches the metadata of the disk partition into the page cache may be executed in parallel with another system startup process, which reduces time required for system startup. Therefore, congestion occurring when a system of the terminal device starts can be effectively avoided, and time required for system startup can be reduced.

Figure 2:
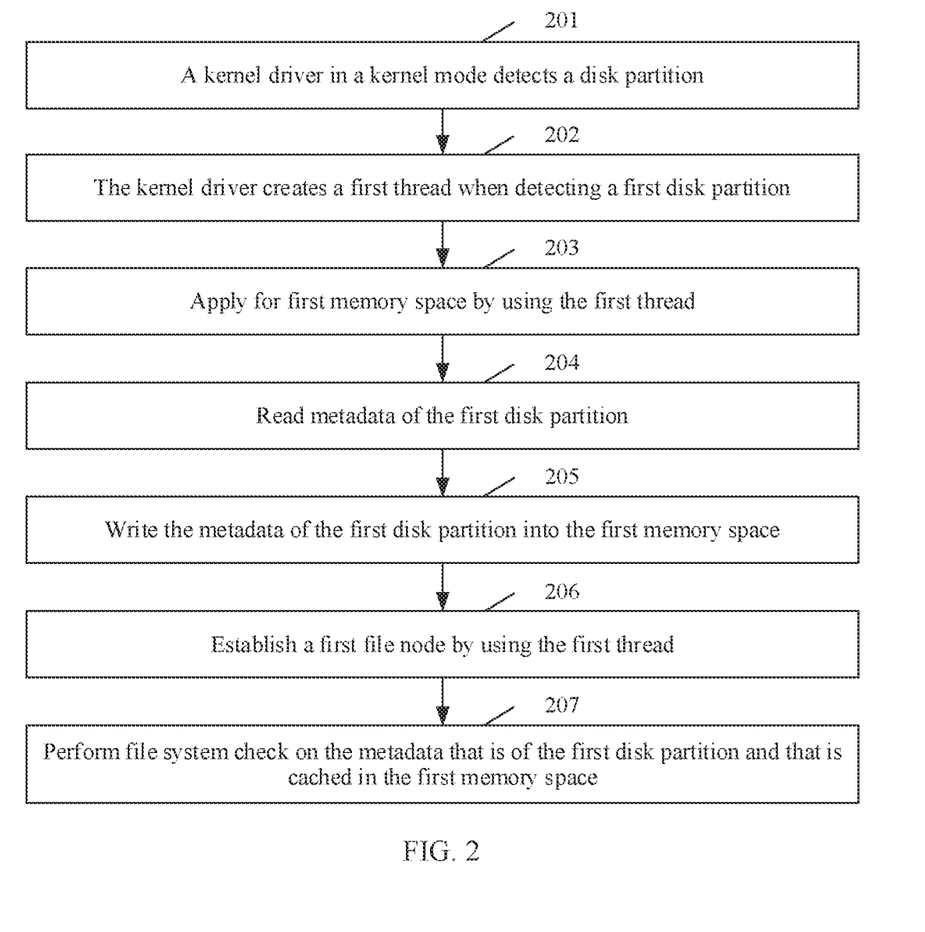
FIG. 2 is a schematic diagram of an embodiment of another system startup method according to an embodiment of this application.

In addition to the process of the foregoing embodiment, time spent on system startup is reduced. This application further provides another system startup method, to reduce time required for system startup. FIG. 2 is a schematic diagram of an embodiment of another system startup method according to an embodiment of this application. In this embodiment of this application, an example in which a system of a terminal device is a Linux system is also used for description.

201: A kernel driver in a kernel mode detects a disk partition.

In this embodiment, step 201 is similar to step 101. Details are not described herein again.

202: The kernel driver creates a first thread when detecting the first disk partition.

In this embodiment, step 202 is similar to step 102. Details are not described herein again.

203: Apply for first memory space by using the first thread.

In this embodiment, in the kernel mode, after detecting the first disk partition, the terminal device creates the first thread. The terminal device applies for the first memory space in a memory by using the first thread. A size of the first memory space is determined by a metadata amount of the first disk partition. Usually, when a total capacity of the first disk partition is 64 gigabytes (gigabyte, GB), the metadata amount of the first disk partition is 2(0) megabytes (mbit, MB). Therefore, a size of the applied first memory space is 200 MB, that is, a 200 MB memory block is applied for. If the total capacity of the first disk partition is 512 GB, the size of the first memory space is 500 MB. It should be noted that when the metadata amount of the first disk partition is 300 MB, the amount of data that needs to be read may be less than 300 MB, for example, 100 MB, or may be greater than 30) MB, for example, 400 MB, which is not limited herein.

204: Read metadata of the first disk partition.

In this embodiment, after the first memory space is applied for by using the first thread, the metadata of the first disk partition is read by using the first thread.

In an optional implementation, the first thread reads the metadata of the first disk partition by calling a page operation function. A specific reading method is similar to step 104. Details are not described herein again.

205: Write the metadata of the first disk partition into the first memory space.

In this embodiment, the first thread writes the read metadata of the first disk partition into the first memory space. A specific writing method is similar to step 105. Details are not described herein again.

206: Establish a first file node by using the first thread.

In this embodiment, to enable a subsequent step to perform an operation on the metadata that is of the first disk partition and that is cached in the first memory space, the first file node needs to be established by using the first thread, and the first file node is mapped to the first memory space.

In an optional implementation, the first file node may be a file node in a "proc" directory. An address name of the first file node may be "proc/block/xxx", and "xxx" may be changed based on an actual situation. For example, the address name of the first file node may be "proc/block/userdata", or may be "proc/block/123". This is not limited herein.

Specifically, in the Linux system, the "proc" directory is a file system, that is, a proc file system. The proc file system is a pseudo file system (namely, a virtual file system), and stores a series of special files of a current kernel running status. A user can view information about system hardware and currently running processes through these files, and change the kernel running status by modifying some of these files.

207: Perform file system check on the metadata that is of the first disk partition and that is cached in the first memory space.

In this embodiment, in a user mode, the terminal device performs the file system check on the metadata that is of the first disk partition and that is cached in the first memory space.

In an optional implementation, an initialization (init) process in the user mode implements, by accessing the first file node, a read operation on the metadata that is of the first disk partition and that is cached in the first memory space. In a process of performing the file system check, if a write operation needs to be performed, in addition to performing the write operation on the first memory space, the write operation needs to be performed on the first disk partition at the same time. An example in which a file system check result is recorded is used. The terminal device vwrites the file system check result into the first memory space by accessing the first file node. At the same time, the file system check result is written into the first disk partition. Data is synchronously written to a memory block and a disk, to ensure that the data in the memory block is consistent with the data in a corresponding location in the disk.

Specifically, the first disk partition is accessed by accessing an address "dev/block/userdata" of the first disk partition. It should be noted that the address of the first disk partition is merely an example for description. This is not limited herein.

When the file system check result is normal, the terminal device releases the first memory space, subsequently performs mounting (mount), reads the metadata of the first disk partition by accessing the address of the first disk partition, and performs mounting by using the metadata of the first disk partition.

In this embodiment of this application, when the terminal device system is started, in the kernel mode, the metadata of the first disk partition is cached in the first memory space by calling the first thread. In the subsequent user mode, when the file system check is performed, the metadata that is of the first disk partition and that is cached in the first memory space is directly read. Because the first thread caches the metadata of the first disk partition in the first memory space, this action may be performed in parallel with another startup process, to effectively reduce time required for system startup.

The foregoing mainly describes the solutions provided in the embodiments of this application from a perspective of the method. It may be understood that to implement the foregoing functions, the terminal device includes corresponding hardware structures and/or software modules for performing the functions. A person skilled in the art should be easily aware that, in combination with the examples of modules and algorithm steps described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the terminal device may be divided into functional modules based on the foregoing method examples. For example, each functional module may be obtained through division based on each corresponding function, or two or more functions may be integrated into one processing module 301. The integrated module may be implemented in a form of hardware, or may be implemented in a form of a software functional module. It should be noted that, in the embodiments of this application, division into the modules is an example, and is merely a logical function division. During actual implementation, another division manner may be used.

Figure 3:
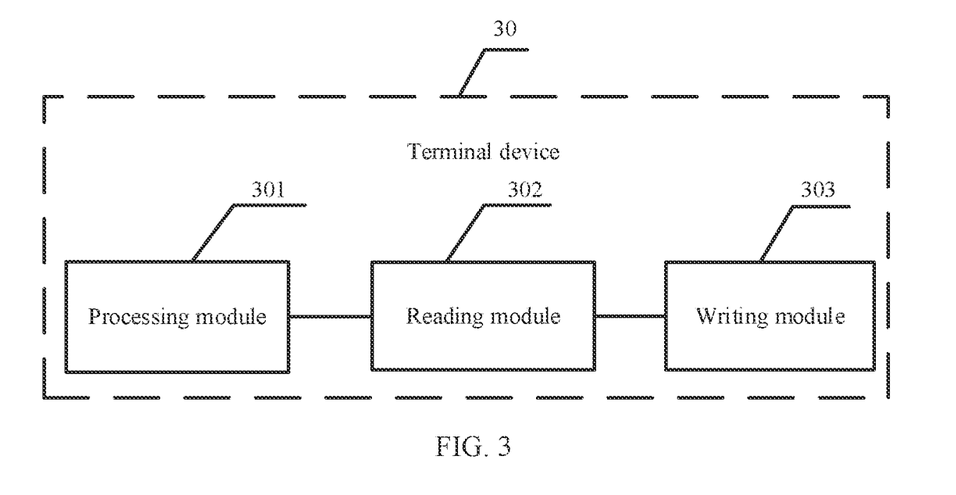
FIG. 3 is a schematic diagram of an embodiment of a terminal device according to an embodiment of this application.

The following describes a terminal device in this application in detail. FIG. 3 is a schematic diagram of an embodiment of the terminal device according to an embodiment of this application. The terminal device 30 includes:
  a processing module 301, configured to create a first thread when a kernel driver in a kernel mode detects a first disk partition;
  a reading module 302, configured to read, in the kernel mode, metadata of the first disk partition by using the first thread; and
  a writing module 303, configured to write the metadata of the first disk partition into a first page cache by using the first thread.

In some embodiments of this application, the terminal device 30 includes:
  the processing module 301 is specifically configured to detect, by using the kernel driver in the kernel mode, whether a current disk partition is the first disk partition;
  the processing module 301 is specifically configured to: when determining, by using the kernel driver, that the current disk partition is the first disk partition, call a first function to create the first thread; and
  the processing module 301 is specifically configured to transfer a first structure pointer and a first partition number of the first disk partition to the first thread, where the first structure pointer is a generic disk structure pointer of the first disk partition, and the first partition number is a partition number of the first disk partition.

In some embodiments of this application, the terminal device 30 includes:
  the reading module 302 is specifically configured to call a third function by using the first thread to enable the first disk partition; and
  the reading module 302 is specifically configured to: call a page operation function by using the first thread, and read the metadata of the first disk partition by using the page operation function.

In some embodiments of this application, the terminal device 30 includes:
  the reading module 302 is further configured to call a second function by using the first thread based on the first structure pointer and the first partition number of the first disk partition, to obtain a first block pointer, where
  the first block pointer is a block device structure pointer corresponding to the first disk device;
  the reading module 302 is further configured to: call the third function by using the first thread, and transfer the first block pointer to the third function; and
  the reading module 302 is further configured to enable the first disk partition based on the first block pointer by using the third function.

In some embodiments of this application, the terminal device 30 includes:
  the reading module 302 is specifically configured to: transfer, to the page operation function by using the first thread, an amount of data that needs to be read and an offset status of the amount of data that needs to be read; and
  read, by using the page operation function, the metadata of the first disk partition based on the amount of data that needs to be read and the offset status of the amount of data that needs to be read.

In some embodiments of this application, the terminal device 30 includes:
  the writing module 303 is specifically configured to write the read metadata of the first disk partition into the first page cache by using the page operation function.

In some embodiments of this application, the terminal device 30 includes:
  the processing module 301 is further configured to perform file system check on the first disk partition in a user mode, and if a file system check fsck result of the first disk partition is normal,
  the processing module 301 is further configured to query, based on a first index relationship and by calling a fourth function, whether cached data exists in the first page cache, where the first index relationship includes first address space that manages the first page cache and a first index node that manages the first address space: and
  the processing module 301 is further configured to: if the cached data exists in the first page cache, perform mounting by using the cached data.

In some embodiments of this application, the terminal device 30 includes:
  the processing module 301 is further configured to: if the cached data does not exist in the first page cache, read the metadata of the first disk partition by calling a fifth function; and
  the processing module 301 is further configured to perform mounting by using the metadata of the first disk partition.

In some embodiments of this application, the terminal device 30 includes:

the processing module 301 is further configured to apply for first memory space by using the first thread in the kernel mode;

the processing module 301 is further configured to read the metadata of the first disk partition by using the first thread: and the processing module 301 is further configured to write the metadata of the first disk partition into the first memory space by using the first thread.

In some embodiments of this application, the terminal device 30 includes:

the processing module 301 is further configured to establish a first file node by using the first thread, where the first file node is mapped to the first memory space:

the processing module 301 is further configured to: in a user mode, read, by accessing the first file node, the metadata that is of the first disk partition and that is cached in the first memory space; and the processing module 301 is further configured to: perform file system check on the cached metadata of the first disk partition, and record a file system check result.

In some embodiments of this application, the terminal device 30 includes:

the processing module 301 is further configured to write the result to the first disk partition while writing the result to the first memory space by accessing the first file node.

Figure 4:
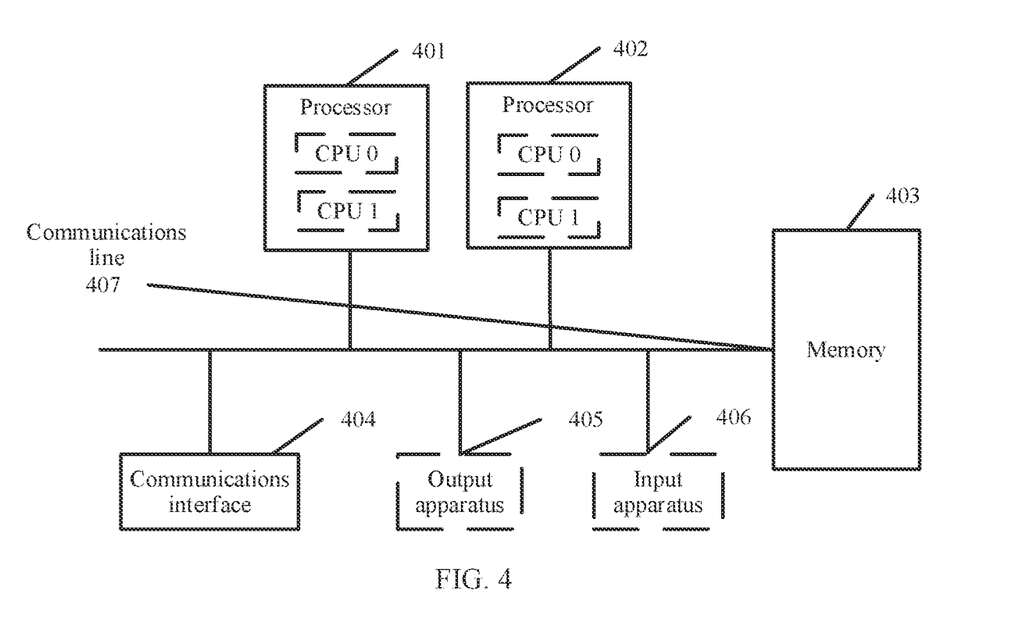
FIG. 4 is a schematic diagram of a hardware structure of a terminal device according to an embodiment of this application.

The foregoing describes the terminal device in the embodiments of this application from a perspective of a modular functional entity, and the following describes the terminal device in the embodiments of this application from a perspective of hardware processing. FIG. 4 is a schematic diagram of a hardware structure of a terminal device according to an embodiment of this application. As shown in FIG. 4, the terminal device may include:

FIG. 4 is a schematic diagram of a hardware structure of a terminal device according to an embodiment of this application. As shown in FIG. 4, the terminal device may include:

The terminal device includes at least one processor 401, a communications line 407, a memory 403, and at least one communications interface 404.

The processor 401 may be a general-purpose central processing unit (central processing unit, CPU), a microprocessor, an application-specific integrated circuit (application-specific integrated circuit, ASIC), or one or more integrated circuits configured to control program execution of the solution in this application.

The communications line 407 may include a path for transmitting information between the foregoing components.

The communications interface 404 is any apparatus such as a transceiver, and is configured to communicate with another device or communications network such as an Ethernet.

The memory 403 may be a read-only memory (read-only memory, ROM), another type of static storage device that may store static information and instructions, a random access memory (random access memory, RAM), or another type of dynamic storage device that may store information and instructions. The memory may exist independently, and is connected to the processor through the communications line 407. The memory may alternatively be integrated with the processor.

The memory 403 is configured to store computer-executable instructions for executing the solutions in this application, and the processor 401 controls the execution. The processor 401 is configured to execute the computer-executable instructions stored in the memory 403, to implement the system startup method provided in the foregoing embodiments of this application.

Optionally, the computer-executable instructions in this embodiment of this application may also be referred to as application program code. This is not specifically limited in this embodiment of this application.

During specific implementation, in an embodiment, the terminal device may include a plurality of processors, for example, the processor 401 and a processor 402 in FIG. 4. Each of the processors may be a single-core (single-CPU) processor or a multi-core (multi-CPU) processor. The processor herein may be one or more apparatuses, circuits, and/or processing cores configured to process data (such as a computer program instruction).

In specific implementation, in an embodiment, the terminal device may further include an output apparatus 405 and an input apparatus 406. The output apparatus 405 communicates with the processor 401, and may display information in a plurality of manners. The input apparatus 406 communicates with the processor 401, and may receive an input of a user in a plurality of manners. For example, the input apparatus 406 may be a mouse, a touchscreen apparatus, a sensing apparatus, or the like.

Figure 5:
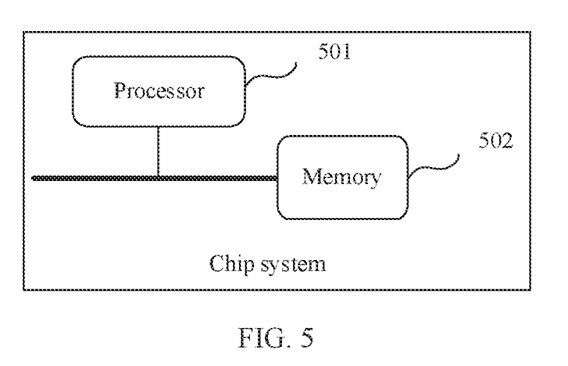
FIG. 5 is a schematic diagram of a structure of a chip system according to an embodiment of this application.

This application further provides a chip system. Referring to FIG. 5, the chip system includes a processor 501 and a memory 502. The memory 502 is configured to store program instructions and data that are necessary for a terminal device. The chip system may include a chip, or may include a chip and another discrete component.

In a possible design, the chip system further includes a power supply and a transceiver (not shown in FIG. 5), configured to support the terminal device in implementing a function of the terminal device, for example, receiving, by using the transceiver, data and/or information in the foregoing method embodiments, for example, the metadata of the first disk partition. After receiving the data and/or information in the foregoing method embodiments, the transceiver sends the data and/or information to the processor 501, so that the processor 501 processes the data and/or information.

In addition, it should be noted that the described apparatus embodiments are merely examples. The units described as separate parts may or may not be physically separate, and parts displayed as units may or may not be physical units, that is, may be located in one place, or may be distributed on a plurality of network units. Some or all the modules may be selected according to an actual need to achieve the objectives of the solutions of the embodiments. In addition, in the accompanying drawings of the apparatus embodiments provided by this application, connection relationships between modules indicate that the modules have communication connections with each other, which may be specifically implemented as one or more communications buses or signal cables.

Based on the description of the foregoing implementations, a person skilled in the art may clearly understand that this application may be implemented by using software in combination with necessary universal hardware, or certainly, may be implemented by using dedicated hardware, including a dedicated integrated circuit, a dedicated CPU, a dedicated memory, a dedicated component, or the like. Generally, any function that can be completed by using a computer program can be very easily implemented by using corresponding hardware. Moreover, a specific hardware structure used to implement a same function may be in various forms, for example, in a form of an analog circuit, a digital circuit, a dedicated circuit, or the like. However, as for this application, software program implementation is a better implementation in most cases. Based on such an understanding, the technical solutions of this application essentially or the part contributing to the conventional technology may be embodied in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a terminal device to perform the methods described in the embodiments of this application.

All or some of the foregoing embodiments may be implemented by using software, hardware, firmware, or any combination thereof. When the software is used to implement the embodiments, the embodiments may be implemented completely or partially in a form of a computer program product.

The computer program product includes one or more computer instructions. When the computer program instructions are loaded and executed on the computer, the procedures or the functions according to the embodiments of this application are all or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid-State Disk, SSD)), or the like.

It should be understood that "one embodiment" or "an embodiment" mentioned in the entire specification means that particular features, structures, or characteristics related to the embodiments are included in at least one embodiment of this application. Therefore, "in one embodiment" or "in an embodiment" appearing in the entire specification does not refer to a same embodiment. In addition, these particular features, structures, or characteristics may be combined in one or more embodiments in any proper manner. It should be understood that sequence numbers of the foregoing processes do not mean execution orders in various embodiments of this application. The execution orders of the processes should be determined based on functions and internal logic of the processes, and should not be construed as any limitation on the implementation processes of the embodiments of this application.

In addition, the terms "system" and "network" may be used interchangeably in this specification. The term "and/or" in this specification describes only an association relationship for associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that in the embodiments of this application, "B corresponding to A" indicates that B is associated with A, and B may be determined according to A. However, it should be further understood that determining B based on A does not mean that B is determined based on only A. B may alternatively be determined based on A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected based on actual requirements to achieve the objectives of the solutions of the embodiments.

In addition, the functional units in the embodiments of this application may be integrated into one processing unit, or each of the units may exist alone physically, or two or more of the units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions in this application essentially, or the part contributing to the conventional technology, or all or some of the technical solutions may be represented in a form of a software product. The computer software product is stored in a storage medium and includes several instructions for instructing a computer device (which may be a personal computer, a server, a network device, or the like) to perform all or some of the steps of the methods described in the embodiments of this application.

In summary, what is described above is merely example embodiments of the technical solutions of this application, but is not intended to limit the protection scope of this application. Any modification, equivalent replacement, or improvement made without departing from the spirit and principle of this application shall fall within the protection scope of this application.

What is claimed is:

1. A method comprising:
creating, by calling a first function, a first thread when a kernel driver in a kernel mode detects a first disk partition;
calling a second function to obtain a first block pointer, wherein the first block pointer is a block device structure pointer corresponding to the first disk partition;
enabling the first disk partition based on the first block pointer;
reading, in the kernel mode, metadata of the first disk partition using the first thread; and
writing the metadata into a first page cache using the first thread.

2. The method of claim 1, further comprising:
detecting, using the kernel driver in the kernel mode, whether a current disk partition is the first disk partition;
calling the first function to create the first thread when the current disk partition is the first disk partition; and
transferring a first structure pointer and a first partition number of the first disk partition to the first thread, wherein the first structure pointer is a generic disk structure pointer of the first disk partition.

3. The method of claim 2, further comprising:
calling a third function using the first thread to enable the first disk partition;
calling a page operation function using the first thread; and
reading the metadata using the page operation function.

4. The method of claim 3, wherein before calling the third function, the method further comprises:
calling the second function using the first thread based on the first structure pointer and the first partition number to obtain the first block pointer;
further calling the third function using the first thread;
transferring the first block pointer to the third function; and
further enabling the first disk partition using the third function.

5. The method of claim 3, further comprising:
transferring, to the page operation function using the first thread, an amount of data to be read and an offset status of the amount of data; and
further reading, using the page operation function, the metadata based on the amount of data and the offset status.

6. The method of claim 5, further comprising writing the metadata into the first page cache using the page operation function.

7. The method of claim 1, further comprising:
performing a file system check (fsck) on the first disk partition in a user mode to obtain an fsck result; and
when the fsck result is normal:
querying, based on a first index relationship and by calling a fourth function, whether cached data exists in the first page cache, wherein the first index relationship comprises a first address space that manages the first page cache and a first index node that manages the first address space; and
performing mounting using the cached data when the cached data exists in the first page cache.

8. The method of claim 7, wherein after querying whether the cached data exists in the first page cache, the method further comprises:
reading the metadata by calling a fifth function when the cached data does not exist in the first page cache; and
performing mounting using the metadata.

9. The method of claim 1, wherein after creating the first thread, the method further comprises:
applying for a first memory space using the first thread in the kernel mode;
further reading the metadata using the first thread; and
writing the metadata into the first memory space using the first thread.

10. The method of claim 9, wherein after writing the metadata into the first memory space, the method further comprises:
establishing a first file node mapped to the first memory space using the first thread;
reading, in a user mode and by accessing the first file node, the metadata that is cached in the first memory space;
performing a file system check (fsck) on the metadata of the first disk partition to obtain an fsck result; and
recording the fsck result.

11. The method of claim 10, wherein recording the fsck result comprises writing the fsck result to the first disk partition while writing the fsck result to the first memory space by accessing the first file node.

12. A terminal device comprising:
a memory configured to store instructions; and
a processor coupled to the memory, wherein the instructions cause the processor to be configured to:
create, by calling a first function, a first thread when a kernel driver in a kernel mode detects a first disk partition;
call a second function to obtain a first block pointer, wherein the first block pointer is a block device structure pointer corresponding to the first disk partition;
enable the first disk partition based on the first block pointer;
read, in the kernel mode, metadata of the first disk partition using the first thread; and
write the metadata into a first page cache using the first thread.

13. The terminal device of claim 12, wherein the instructions further cause the processor to be configured to:
detect, using the kernel driver in the kernel mode, whether a current disk partition is the first disk partition;
call the first function to create the first thread when the current disk partition is the first disk partition; and
transfer a first structure pointer and a first partition number of the first disk partition to the first thread, wherein the first structure pointer is a generic disk structure pointer of the first disk partition.

14. The terminal device of claim 13, wherein the instructions further cause the processor to be configured to:
call a third function using the first thread to enable the first disk partition;
call a page operation function using the first thread; and
read the metadata using the page operation function.

15. The terminal device of claim 14, wherein the instructions further cause the processor to be configured to:
- call the second function using the first thread based on the first structure pointer and the first partition number to obtain the first block pointer;
- further call the third function using the first thread;
- transfer the first block pointer to the third function; and
- enable the first disk partition based on the first block pointer and using the third function.

16. The terminal device of claim 14, wherein the instructions further cause the processor to be configured to:
- transfer, to the page operation function using the first thread, an amount of data to be read and an offset status of the amount of data; and
- further read, using the page operation function, the metadata based on the amount of data and the offset status.

17. The terminal device of claim 16, wherein the instructions further cause the processor to be configured to write the metadata into the first page cache using the page operation function.

18. The terminal device of claim 12, wherein the instructions further cause the processor to be configured to:
- perform a file system check (fsck) on the first disk partition in a user mode; and
- when an fsck result of the first disk partition is normal:
  - query, based on a first index relationship and by calling a fourth function, whether cached data exists in the first page cache, wherein the first index relationship comprises a first address space that manages the first page cache and a first index node that manages the first address space; and
  - perform mounting by using the cached data when the cached data exists in the first page cache.

19. The terminal device of claim 18, wherein the instructions further cause the processor to be configured to:
- read the metadata by calling a fifth function when the cached data does not exist in the first page cache; and
- perform mounting using the metadata.

20. A computer program product comprising computer-executable instructions that are stored on a non-transitory computer-readable medium and that, when executed by a processor, cause a terminal device to:
- create, by calling a first function, a first thread when a kernel driver in a kernel mode detects a first disk partition;
- call a second function to obtain a first block pointer, wherein the first block pointer is a block pointer corresponding to the first disk partition;
- enable the first disk partition based on the first block pointer;
- read, in the kernel mode, metadata of the first disk partition using the first thread; and
- write the metadata into a first page cache using the first thread.

* * * * *